Patented Aug. 29, 1950

2,520,420

UNITED STATES PATENT OFFICE 2,520,420

TANK TURRET CONTROL

Henry Tyler Marcy, Medford, Mass., assignor to Massachusetts Institute of Technology, Cambridge, Mass.

Application May 7, 1945, Serial No. 592,391

12 Claims. (Cl. 74—472)

This invention relates to a director or control mechanism for imparting to an output element successive movements of desired amplitudes or continuous movements of any desired speeds within the performance limits of the apparatus. For example, the output element may be a shaft, rotation of which results in a corresponding rotation of a military tank turret by a power-actuated servomechanism. Another feature of the invention is the provision of a plurality of control stations from which the director receives signals and responds by appropriate movements of the output element.

The mechanism hereinafter described in detail is designed for use in controlling the angular position and the rotation of the gun turret of a military tank. The crew of a tank usually includes a tank commander and a gunner. According to the present invention a dual control is provided whereby the angular position and movements of the turret are usually controlled from the gunner's station, the mechanism being such as to enable the gunner to change the angular position of the turret as desired, or, alternatively, to cause the turret to rotate at a constant speed which may be changed as desired. Thus the gunner can exercise positional control or speed control at his option. The mechanism can also be controlled from the commander's station, the arrangement being such as to enable the commander to take charge at will and thereupon to cause the turret to rotate any any speed within the performance limits of the mechanism.

It is a further object of the invention to include in the mechanism a non-linear relationship between the amount of displacement of the manual member from a neutral position at either control station and the speed of rotation of the output shaft resulting therefrom. In terms of performance this means that for a slight movement of the manual control member from neutral position at either control station, a very low speed of rotation of the output element results. For greater displacements of the manual control member there are resultant speeds of rotation of the output element which are more than proportional to the amounts of displacements of the control elements. Thus, in the case of a tank turret, a distant target, the angle of bearing of which changes very slowly, can be tracked by rotating the turret at very low speeds which are nevertheless constant and closely controlled. In slewing the turret to change from one target to another, however, the maximum speed of rotation of the turret can readily be obtained by a moderate displacement of the manual control member from its neutral position.

For a more complete understanding of the invention, reference may be had to the following description of an embodiment thereof and to the drawings of which:

Figure 1:
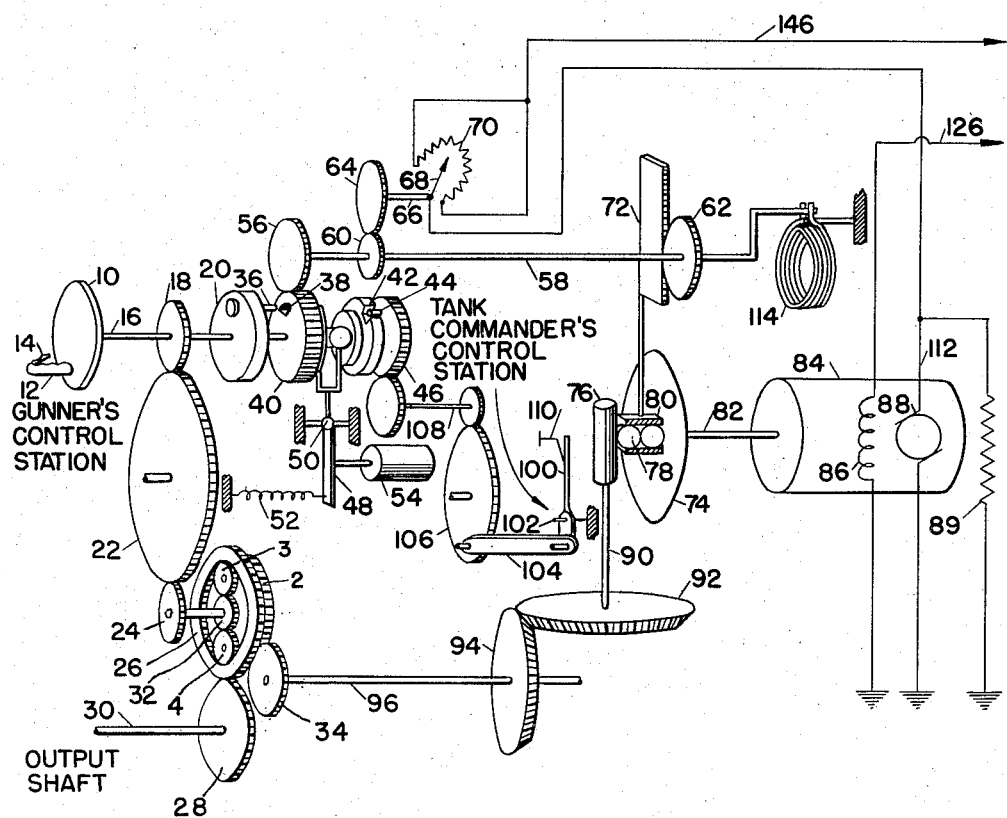
Figure 1 is a schematic representation of apparatus embodying the invention.

Referring to Figure 1, the handwheel or manual control member at the gunner's station is shown at 10. This wheel is preferably provided with a suitable crank handle 12 having a finger lever 14 thereon, the function of which is hereinafter described in more detail. The wheel 10 is mounted on a shaft 16 by which the gunner's control station is mechanically connected with the director. Included in the latter are a pinion 18 and a clutch element 20 both of which are mounted on the shaft 16. A mechanical connection conventionally represented by a gear wheel 22 connects the pinion 18 with a gear wheel 24 which is an element of a differential gear 26 in the director. The differential gear as shown in Figure 1 may be of the planetary type having a carrier in the form of a disk 2 with gear teeth on the periphery in mesh with gear 34 on shaft 96. The peripheral gear teeth of the differential ring gear 26 mesh with a gear 28 which is fixed to the output shaft 30. The gear wheel 24 is fixed to the same shaft as the sun gear 32, and the latter meshes with planetary gears such as 3 and 4, journaled upon disk gear 2. Gears 3 and 4 also mesh with internal teeth on ring gear 26. The gear 28 and shaft 30 are thus driven in accordance with the algebraic sum of the rotations of gears 22 and 34, in the manner well known in the art. Shaft 96 is adapted to be driven by a power mechanism hereinafter described. It is thus evident that when the power-driven gear wheel 34 is stationary, the output shaft 30 may be rotated by rotation of the handwheel 10. In this manner the gunner can change at will the angular position of the output shaft 30, and thus the angular position of the tank turret if the shaft 30 is suitably connected to a mechanism for causing rotative movement of such turret.

The clutch element 20 on the shaft 16 has a pin 36 projecting from the face thereof adapted to enter a cavity 38 in a clutch member 40 which is loosely mounted in a position co-axial with the shaft 16 and is axially movable to and from a position of operative engagement with the clutch element 20, the drawing showing this member disengaged from the element 20. The pin 36 is spring-loaded so as to yield resiliently if the clutch member 40 is shifted toward the element 20 when the cavity 38 is not in line with the pin 36.

The clutch member 40 also includes a second disk having a cavity 42 adapted to receive a spring-loaded pin 44 projecting from the face of a gear wheel 46 which also is co-axial with the shaft 16 but not secured thereto. A clutch lever 48 is rockably mounted at 50 and engages between the discs of the clutch member 40 so as to shift this member into alternative engagement with the clutch element 20 or the gear wheel 46. The arrangement is such that member 40 is never in engagement with element 20 and gear 46 at the same time. A suitable spring 52 is attached to the lever 48 in such a manner as to press the clutch member 40 toward engagement with the gear wheel 46. A solenoid 54 is attached to the lever 48 and is adapted, when energized, to rock the lever 48 against the tension of the spring 52 so as to move the clutch member 40 toward the clutch element 20. The clutch member 40 will then operatively engage the element 20 if or when the pin 36 is in line with the cavity 38. The disc of the clutch member 40 which contains the cavity 38 is provided with peripheral gear teeth which are constantly in mesh with the teeth of a gear wheel 56 regardless of the position of the clutch member 40. The gear wheel 56 is mounted on a shaft 58 on which are also mounted a pinion 60 and a gear wheel 62. The pinion 60 meshes with a gear wheel 64 which is on a shaft 66 with the sliding contact element 68 of a potentiometer 70 hereinafter described. The gear wheel 62 meshes with a rack 72 which controls a ball-disc transmission consisting essentially of a disc 74, a rotatable cylinder 76 and a ball drive 78 contained in a carriage 80 which is connected directly to the rack 72. A transmission of this type is suitable for low-energy speed control. The disc 74 is mounted on the shaft 82 of an electric motor 84, the field winding of which is indicated at 86, the rotor being indicated at 88. This motor is preferably small and is constructed so that it quickly starts and stops when the current thereto is turned on and off. By means of a shunt resistance 89 and the variable resistance 70, the desired range of speeds of the motor is obtained.

When the ball drive 78 is in the center of the disc 74, there is no rotation thereof by the disc. When the ball drive 78 is displaced from the center of the disc by a movement of the rack 72, it will be rotated in one direction or the other by the disc and will impart rotation to the cylinder 76, the direction of such rotation depending on whether the rack moves up or down from the neutral position. The cylinder 76 is mounted on a suitable shaft 90 which also carries a gear wheel 92 meshing with a corresponding gear 94 on a shaft 96 on which also is mounted the gear wheel 34. Thus, if the rack 72 is moved from its neutral position by angular displacement of the clutch member 40 from its neutral position, the motor 84 will cause the rotation of the gear wheel 34 at a speed depending in part on the amount of displacement of the rack 72 from its neutral position. If the handwheel 10 is held stationary the rotation of the gear wheel 34, transmitted through the differential gear 26, will produce a corresponding rotation of the output shaft 30. Preferably, the gear ratios in the mechanism are so selected that the maximum rate of rotation of the output shaft 30 which can be brought about by manual operation of the handwheel 10 is considerably less than the maximum rate of rotation of the output shaft by the motor 84. Hence, manual operation of the handwheel 10 can modify but not overcome the rotation of the output shaft by the motor when the latter is operated at slewing speeds.

As hereinafter described, the finger lever 14 on the gunner's handwheel operates an electric switch by which the circuit for energizing the solenoid 54 can be closed by the gunner, subject to the ability of the commander to de-energize the solenoid at any time. At the commander's station is a control handle 100 which is rockable on a pivot axis 102 to reciprocate a link 104 which extends to a gear wheel 106 to the director mechanism. This gear wheel is connected by a gear train 108 to the gear wheel 46 which is operatively connectable with the clutch member 40 and is normally connected therewith. A finger lever 110 is provided on the handle 100 operating a switch to enable the commander to prevent the gunner from energizing the solenoid or to de-energize the solenoid if it has already been energized, as hereinafter described. Thus the commander can at any time rotate the clutch member 40 so as to shift the rack 72 from its normal position and thus to cause the motor 84 to drive the output shaft 30 at any desired speed within the performance limits of the apparatus.

A spring centering device 114 is provided to oppose yieldingly any movement of the clutch member 40 from its neutral position and to exert a restoring force when the clutch member is displaced from its neutral position. The centering spring gives a "feel" of resistance to the operator who is operating the speed control and enables him to judge the magnitude of the speed by the amount of resistance felt on the handwheel 10 or manual lever 100.

It is evident that the ratio of the angular speed of rotation of the cylinder 76 to the speed of rotation of the motor shaft 82 will vary as the distance of displacement of the ball-drive 78 from the center of the disc 74, this distance of displacement being in turn proportional to the angular displacement of the clutch member 40 from its neutral position. According to the invention, the apparatus is designed to cause the motor 88 to speed up when the ball drive is moved from the center of the disc 74. This may conveniently be done by the use of the potentiometer 70 by which maximum resistance is in the rotor circuit 112 of the motor 84 when the sliding contact element 68 is at the midpoint of the potentiometer coil 70, this occuring when the clutch member 40 is in its neutral position. Whenever the clutch member 40 is rotated in either direction from its neutral position, the sliding contact 68 moves to reduce the resistance in the rotor circuit 112 and hence to cause an increase of speed of the motor 84 and of the disc 74. The more the clutch member 40 is turned from its neutral position the greater will be this increase in speed of the motor 84. At the same time, the rack 72 displaces the ball-drive 78 from the center of the disc 74 so that the two increases in speed are combined in the drive of the cylinder 76. Hence there is a curvilinear relation between the distance of displacement of the clutch member 40 from its neutral position and the speed of rotation of the gear wheel 34 which is driven from the cylinder 76. The nature of this curvilinear response is dependent on the ratio of the maximum speed to the minimum speed of the motor 84. Hence, small displacements of the clutch member 40 result in rotation of the output shaft 30 at very low speeds but increased displacement of the clutch member 40 results in very much higher speeds of rotation of the output shaft.

Figure 2:
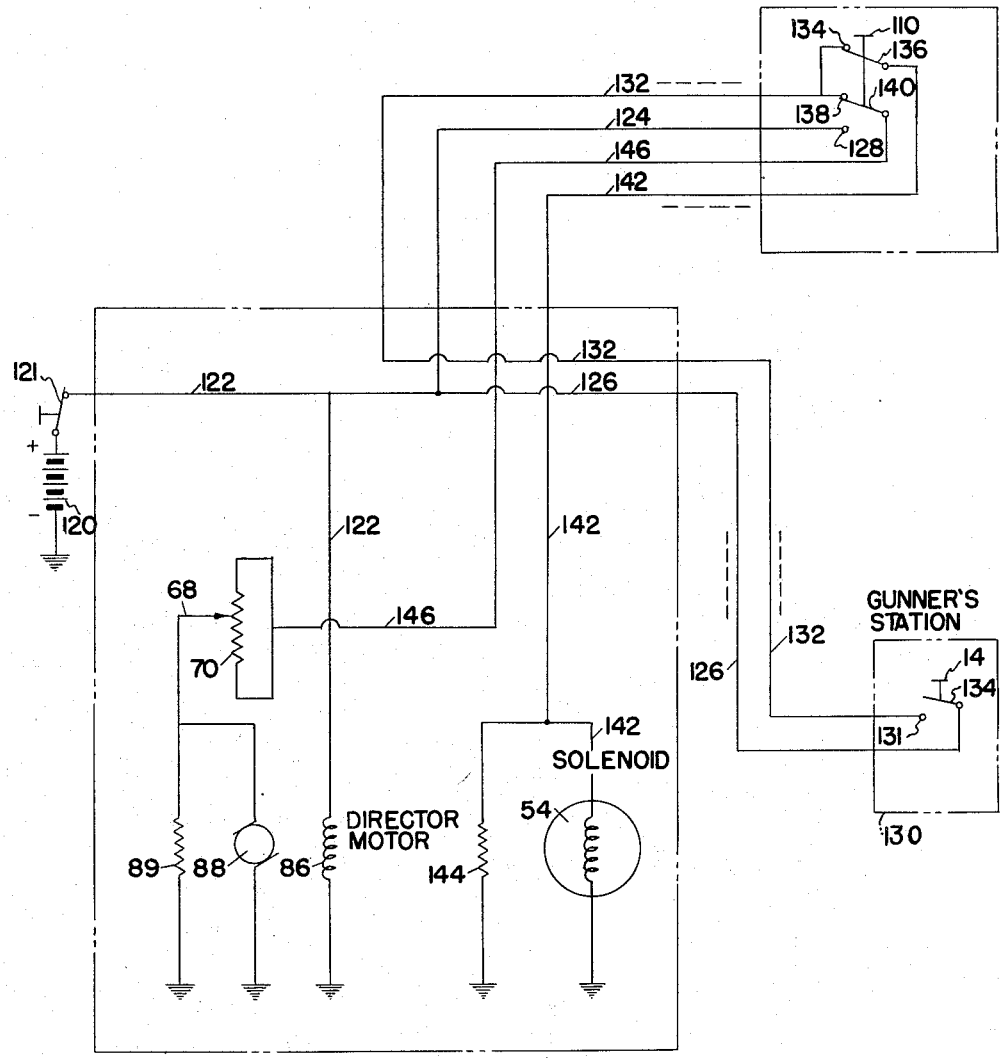
Figure 2 is a wiring diagram of electrical circuits employed therein.

In Figure 2 is shown a wiring diagram of the electrical connections employed with the apparatus indicated in Figure 1. A suitable source of electrical energy, such as a battery 120, is provided to operate the electrical parts of the apparatus. As shown, one terminal of the battery is grounded, the other terminal being connected through a main switch 121 to a wire 122 which remains charged as long as the switch 121 is closed. The wire 122 leads to the field coil 86 of the motor 84. Branching from the wire 122 are two wires 124, 126 which are constantly charged when the main switch is closed. Of these, the wire 124 leads to a terminal 128 in a control switch at the commander's station. The wire 126 leads to a terminal of a switch 130 at the gunner's station which is operated by the finger lever 14 on the handwheel 10. The other terminal 131 of this switch is connected by a wire 132 to a terminal 134 in a switch 136 and also to a terminal 138 of a two-way switch 140, the other terminal 128 of which is connected to the wire 124, both of these switches 136, 140 being operable together by the finger lever 110 at the commander's station. The other terminal of the switch 136 is connected by a wire 142 to the solenoid 54, around which is shunted a resistance 144 to prevent excess voltage from building up in the solenoid upon switching. The switch 140 is connected by a wire 146 to the potentiometer 70.

When the gunner is using the handwheel 10 for positional control, the switches at the two stations are as indicated in Figure 2, and no current flows through the charged wires 124 and 126. If the gunner, however, wishes to employ speed control, he closes the switch 130 by pressing on lever 14 and moves the handwheel 10 to its neutral position in which the pin 36 is in line with the cavity 38. The closing of the switch 130 starts the motor 84 and also closes the circuit through the solenoid 54. The latter causes the clutch member 40 to engage the element 20, thus operatively connecting the shaft 58 with the handwheel 10. The gunner can now, by turning the handwheel 10 one way or the other from the neutral position, move the potentiometer contact 68 and shift the ball-drive 78 from the center of the disc 74 so as to cause rotation of the output shaft 30 at speeds depending on the angular position of the handwheel 10.

Regardless of whether the gunner is using positional control or speed control, the commander can at any time take charge of the speed control apparatus by pressing the finger lever 110 to open the switch 136 and shift the switch 140 from contact at 138 to contact 128. Since the switch 136 is in the solenoid circuit, the opening of this switch prevents the gunner from closing this circuit or opens the circuit if it has already been closed through the switch 130. At the same time, the switch member 140 shifts from the terminal 138 to the terminal 128, thus establishing or maintaining a circuit through the battery 120, the potentiometer and the rotor 88. Release of the finger lever 110 returns control to the gunner. It will be understood that switch member 136 never engages terminal 138.

I claim:

1. Control apparatus of the class described comprising an output shaft, an electric motor, means including a variable speed transmission device connecting said motor and shaft, a member movable to vary the speed ratio of said transmission device, a potentiometer operable to vary the speed of said motor, two manual control members each operatively connectible to said movable member and potentiometer, a two-way clutch arranged to connect either of said manual members with said movable member and potentiometer, and an electric switch on each said manual member operable to start said motor.

2. Control apparatus of the class described comprising an output shaft, an electric motor operatively connected to said shaft for rotation thereof at selected speeds, means for changing the speeds of rotation of said shaft, two manual control members, a two-way clutch normally connecting one of said manual members to said speed-changing means, means on the other manual member normally operable to shift said clutch to connect the same with said other manual member for control thereby of the speed-changing means, and means operable to retain or regain control by the first said manual member.

3. Control apparatus of the class described comprising an output shaft, two input elements for imparting rotation to said shaft, a differential gear connecting said input elements with said shaft whereby the shaft responds to the algebraic sum of the inputs of said elements, a first manual control member mechanically connected to one of said input elements whereby all movements of said manual member are transmitted to said differential gear, an electric motor, means including a variable speed device connecting said motor to the other said input element, a potentiometer device for controlling the speed of said motor, means including a clutch element connected to simultaneously operate said potentiometer and variable speed device to vary the speed of said other input element in response to rotation of said clutch element in either direction from a neutral position, a second manual control member normally connected to said clutch element, means including a solenoid for shifting said clutch element from its normal operative connection with said second manual member into connection with said first manual control member, an electric switch on said first manual member operable to close energizing circuits to said solenoid and said motor, and a switch on said second manual member operable to open the solenoid circuit and to close the motor circuit.

4. In a variable speed control, an output shaft, an electric motor, a drive from said motor to said shaft and including a variable speed device, a potentiometer, first means operable to adjust said variable speed device and said potentiometer in unison, first and second control members, a two-way clutch, second means urging said clutch into a position connecting said second control member with said first means, a solenoid operable when energized to move said clutch into a position connecting said first control member with said first means, against the action of said second means, a first circuit for energizing said motor, and including said potentiometer, a second circuit for energizing said solenoid and including first and second switch means at said first and second control members, respectively, said second switch being operable to open said second circuit while maintaining said first circuit closed, 5. In a variable speed drive, an output shaft, a differential having one element connected to said shaft, a motor, a driving connection between said motor and a second element of said differential, said connection including a variable speed device, a manually operable member for driving said output shaft, and connections from said manually operable member to adjust said variable speed device and to a third element of said differential.

6. In a control apparatus, a movable output member, a differential having one element connected to move said member, manually operable means connected to drive a second element of said differential, power-driven means including a variable speed device connected to drive a third element of said differential, a disconnectable drive operable to adjust the speed ratio of said variable speed device in response to actuation of said manually operable means, and means carried by said manually operable means to connect and disconnect said drive.

7. Control apparatus of the class described comprising, an output shaft, a handwheel, means including a differential gear mechanically connecting said handwheel and said output shaft, power means connected to drive said output shaft through said differential, and including a variable speed device, and means responsive to actuation of said handwheel for simultaneously varying the speed of said power means and the drive ratio of said variable speed device to thereby effect rotation of said output shaft in nonlinear relation to the rotation of said handwheel.

8. In a control apparatus for tank turrets, an output shaft adapted to be connected to rotate said turret, power means, a driving connection between said power means and shaft, including a variable speed device, first means operable to vary the speed ratio of said device, second means operable to vary the speed of said power means, first and second spaced manual controls, a clutch normally connecting said first control to simultaneously operate said first and second means, and means including an actuatable part on said second control to operate said clutch to disconnect said first control from said first and second means and to connect said second control with said first and second means.

9. The combination specified in claim 8, said driving connection also including a differential between said variable speed device and said output shaft, and a driving connection between said second manual control and said differential.

10. In a control apparatus for turrets, an output shaft adapted for connection to angularly move said turret, a differential having one element connected to drive said shaft, a first manually operable control member connected to drive a second element of said differential, a motor, a driving connection from said motor to a third element of said differential said connection including a variable speed device, means operable to vary the speed of said motor, a two-way clutch having one element connected to simultaneously adjust said variable speed device and said means, a second manually operable control member remote from said first control member, and means controllable at said second manual control member and operable to selectively and alternatively connect said clutch element for operation by either of said members.

11. In a control apparatus for tank turrets, an output shaft adapted for connection to rotate said turret, a motor, a driving connection between said motor and shaft, including a variable speed device, a clutch comprising first, second and third members, said first member being connected to said variable speed device to vary the speed ratio thereof, first and second spaced manual controls permanently connected to said second and third members, respectively, means normally connecting said first and second clutch members and means controllable at said second manual control and operable to disconnect said first and second clutch members and to connect said first and third clutch members.

12. In a control apparatus of the character described, an output shaft, an electric motor, first means connecting said motor to drive said shaft and including a variable speed device, a potentiometer connected to vary the speed of said motor, second means connected to operate said variable speed device and said potentiometer in unison, two manually operable control members, a two-way clutch operable to connect either of said control members to said second means, spring means urging said clutch into position connecting a selected one of said control members with said second means, a solenoid operable when energized to operate said clutch against the urge of said spring means to connect the other of said control members to said second means, a circuit for controlling said motor and solenoid, said motor circuit including said potentiometer, and switches adjacent each said control member for opening and closing said circuits, the switch at one control member being operable to open the circuit to said solenoid.

H. TYLER MARCY.

REFERENCES CITED

The following references are of record in the file of this patent:

UNITED STATES PATENTS

| Number | Name | Date |
| --- | --- | --- |
| 657,516 | Coleman | Sept. 11, 1900 |
| 1,019,091 | Sacerdoti | Mar. 5, 1912 |
| 1,399,038 | Valois | Dec. 6, 1921 |
| 2,086,030 | Hodgson | July 6, 1937 |
| 2,171,715 | Sinclair | Sept. 5, 1939 |
| 2,294,786 | Lear | Sept. 1, 1942 |
| 2,300,516 | Klein | Nov. 3, 1942 |
| 2,365,982 | Trofimov | Dec. 26, 1944 |
| 2,384,043 | Papello | Sept. 4, 1945 |
| 2,392,889 | Tear | Jan. 15, 1946 |